June 30, 1931.  F. LOPEZ  1,812,750
APPARATUS FOR ELIMINATING A SUBSTANCE FROM A GASEOUS MIXTURE
Filed Nov. 30, 1928  2 Sheets-Sheet 2

INVENTOR
Francesco Lopez
BY HIS ATTORNEY

Patented June 30, 1931

1,812,750

UNITED STATES PATENT OFFICE

FRANCESCO LOPEZ, OF PADOVA, ITALY, ASSIGNOR TO SOCIETÀ ANONIMA INDUSTRIA AMMONIACA, OF PADOVA, ITALY, A CORPORATION OF ITALY

APPARATUS FOR ELIMINATING A SUBSTANCE FROM A GASEOUS MIXTURE

Application filed November 30, 1928, Serial No. 322,902, and in Italy March 26, 1928.

This invention relates to apparatus for separating or purifying gases and more particularly refers to apparatus for isolating gases from gaseous mixtures.

Another object is to provide an apparatus of a novel and improved design whereby it is possible to eliminate a gas or other substance from a gaseous mixture by employing a suitable solvent, the apparatus being so arranged that a good circulation of the solvent may be obtained with the least expenditure of power, and whereby a minimum quantity of solvent may be used for eliminating and collecting the desired gas or substance.

A further object is to provide a novel and improved apparatus of a relatively simple design whereby it is possible to isolate and recover a gas from a gaseous mixture in a simple, reliable and relatively inexpensive manner.

Other objects and advantages of the present invention will more fully appear as the description proceeds and will be set forth and claimed in the appended claims.

My apparatus is particularly suitable for use in eliminating and separating ammonia from other gases at high or low pressures, and for the production of saturated solutions of said gas. In this capacity the apparatus functions as an absorber of the gas to be isolated, causing the same to become dissolved in a suitable solvent and producing solutions thereof of any desired strength up to saturation. The apparatus also comprises means for cooling the solvent during circulation so that its temperature may not materially vary between the point of supply and the point of discharge.

The apparatus essentially comprises a series of vertically spaced chambers preferably in superimposed relation to one another, each chamber being partly filled with solvent through which the gaseous mixture to be purified may be injected so as to bubble through the liquid to the space above.

The solvent is first admitted to the upper chamber and is caused to overflow from this one to the next lower chamber through an external tubular coil, and so on until it reaches the lowermost chamber from which it is discharged after having become saturated with the isolated gas.

The gaseous mixture to be purified is on the other hand, admitted first to the lower chamber and is caused to bubble through the solvent therein contained, then to pass through a discharge outlet from the top of said chamber to be admitted within the liquid body of the solvent contained in the next upper chamber, bubbling through it, and so on until it is discharged from the uppermost chamber, freed of the gas which has been retained in solution by the solvent.

The walls and other parts of the apparatus are designed so as to be able to withstand the operating pressures and temperatures, and the gas is admitted within the liquid near the bottom of each chamber by means of an inverted bell structure which while allowing the gas to bubble through the liquid, prevents the possibility of the liquid being discharged through the same in an opposite direction. This is done by providing a tubular outlet for the gas upwardly extending within each chamber from the top of the next lower chamber, and inserting an inverted bell over said tubular inlet, forming an annular chamber therewith, said inverted bell being free to move vertically in relation to the tubular inlet, so as to constitute a self checking device whereby the bottom of the inverted bell will rest directly against the upper open end of the tubular outlet when the pressure of the gas issuing through said outlet is not sufficient to counterbalance the pressure of the liquid contained within the chamber.

My invention is illustrated by way of example in the annexed drawings in which Fig. 1 is a cross sectional view in elevation of an apparatus embodying the same.

Figure 1:
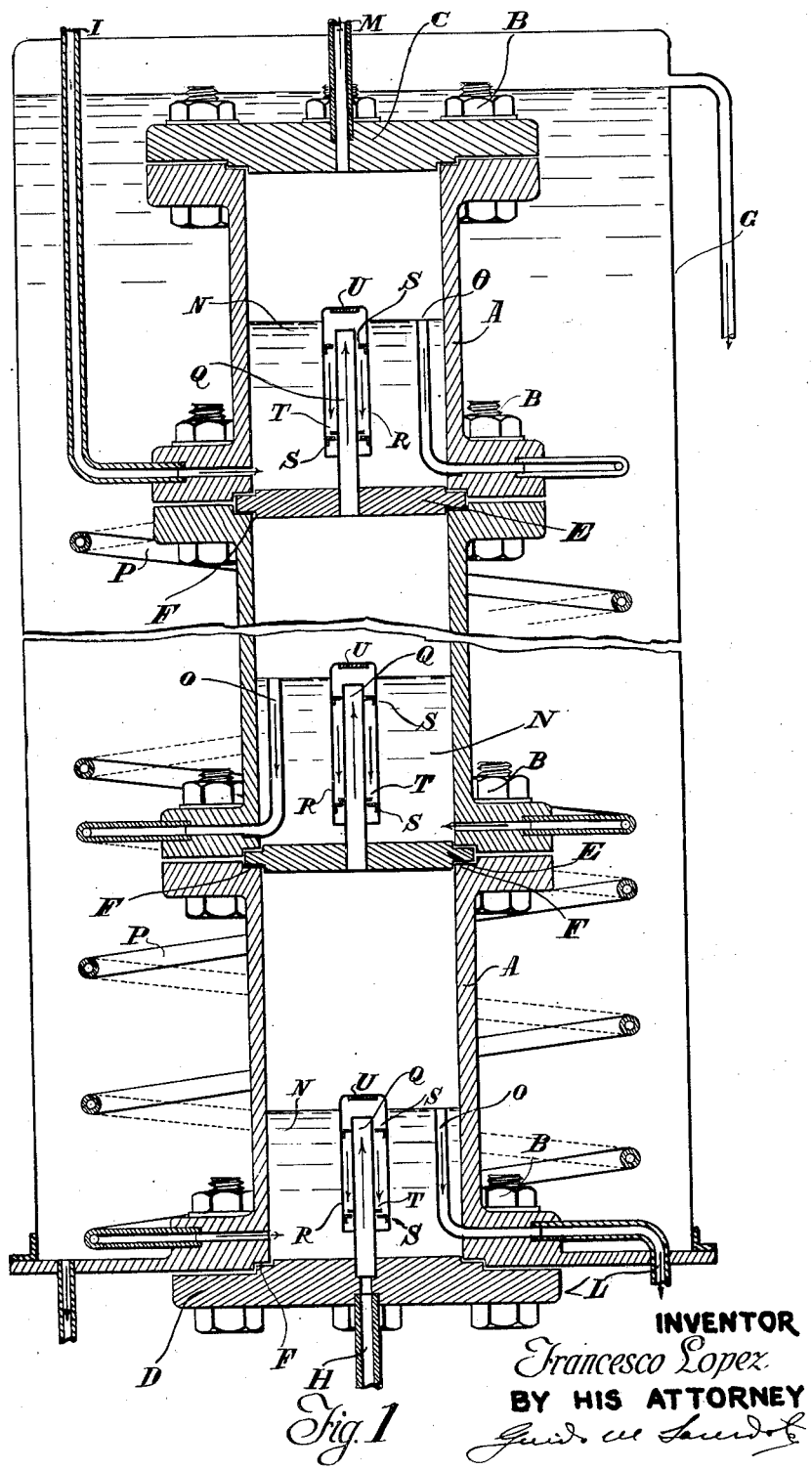
Figure 2:
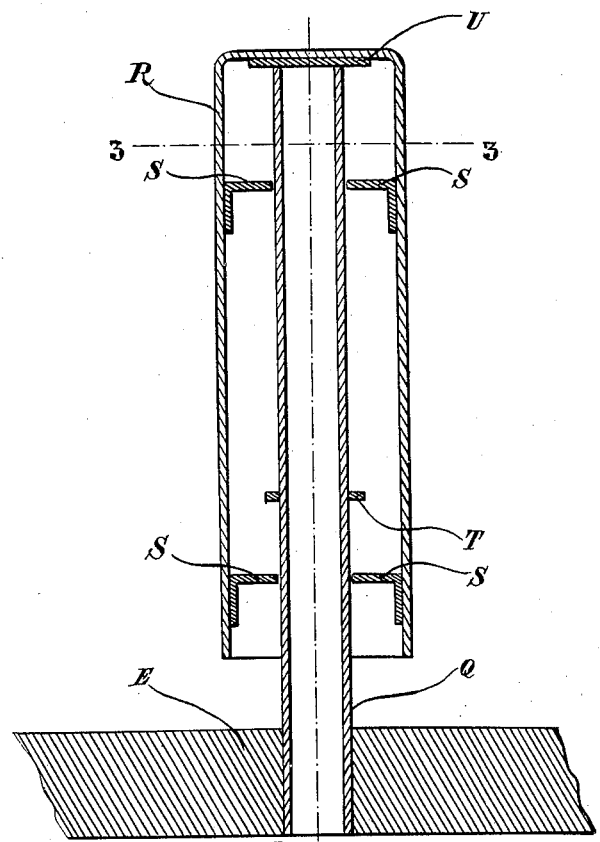
Fig. 2 is a sectional view in detail of one of the tubular outlets and inverted bells.
Figure 3:
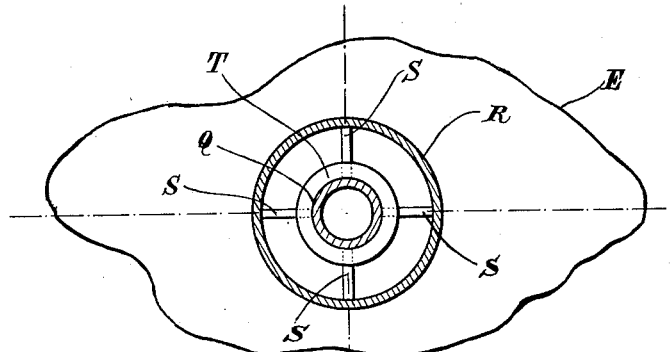
Fig. 3 is a horizontal section on line 3—3 of Fig. 2.

The apparatus illustrated in said drawings comprises a plurality of cylindrical shells A provided with top and bottom flanges, said shells being arranged in superimposed relation to one another and being joined together by bolts or tie rods B.

These shells are of course designed to withstand the pressures of the gases admitted thereto, and the upper chamber is closed by a cover C, while the lower chamber is closed by a bottom D, secured in position by suitable bolts as shown.

The arrangement results in a vertical series of chambers which are separated from one another by partitions E, clamped between the flanges of adjacent shells, said partitions being made of material apt to resist the action of the gases and solvents; and the joints between the partitions and the shells are made tight by means of packings such as F, or in any other suitable manner.

The entire apparatus is enclosed in a water tight receptacle or shell G which acts as a container for a cooling medium which may eventually be employed during the operation.

The gaseous mixture to be treated is admitted through inlet H at the bottom and an inverted bell device Q to a point within the liquid solvent contained in said chamber close to the bottom thereof. The gaseous mixture will therefore bubble through the liquid, and part of the gas to be isolated or absorbed will remain in solution, while the partly purified mixture will issue through an outlet at the top of the chamber within another inverted bell device Q admitting said gaseous mixture to the bottom of the liquid solvent contained in said next chamber. The gaseous mixture will now bubble through said second body of solvent, and so on until the mixture freed of the gas to be isolated or absorbed, reaches the outlet M at the top of the uppermost chamber.

It will be observed that the inverted bell member of each device Q is free to move in a vertical sense with respect to a tubular gas outlet forming part of said device, so that if the pressure of the gas issuing through said outlet should not be sufficient to overcome the counterpressure existing in the chamber, the inverted bell member will descend, its bottom forming a closure for the tubular outlet.

The inverted bell arrangements Q thus prevent the return flow of the liquid therethrough; any suitable arrangement performing the same function can of course be employed, as will be understood.

The solvent is made to travel in a direction opposite to that of the gaseous mixture, being first admitted to the uppermost chamber through inlet I. When the liquid reaches the level N within said chamber it will be discharged within the next lower chamber through an overflow O, preferably through an external coil P which may be used as a cooling coil, by establishing a circulation of water or other cooling agent through receptacle or shell G.

By virtue of this construction it will be understood that the cooling action of the water within receptacle or shell G is also extended to the liquids and gases contained within the shells A.

The quantity of solvent admitted through inlet I may be regulated according to the quantity of gas to be absorbed and according to the strength of the solution to be produced.

It will be understood that while the apparatus is particularly suitable for the separation of a gas from a gaseous mixture, the same may also be used for the elimination of impurities from gases.

The gases and the liquids are caused to follow two independent paths and the possibility of mutual interference is effectively prevented. Due to the fact that gravity is utilized for the passage of the liquid through the various chambers, the power required for the operation of the apparatus is reduced to a minimum; and due to the intimate association of the gaseous mixture with the liquid solvent and the turbulence generated by the bubbling of the gases through the liquid a most efficient dissolving action takes place which permits of limiting to a minimum the quantity of solvent used.

It is obvious that the details of construction of my apparatus may vary from those shown without departing from the inventive idea; the drawings will therefore be understood as being intended for illustrative purposes only, and not in a limiting sense.

I accordingly reserve myself the right to carry my invention into practice in all those ways and manners which may enter, fairly, into the scope of the appended claims.

I claim:

1. Apparatus for freeing a gaseous mixture from a component part thereof, comprising a series of vertically spaced chambers, means for admitting a liquid solvent of said component part to the upper chamber, means causing said liquid solvent to overflow when reaching a predetermined level within said chamber, leading said liquid solvent to the next lower chamber, and so on, to the last chamber, means for admitting the gaseous mixture to the liquid solvent within the said last chamber, and means for successively admitting said gaseous mixture from said last chamber to the liquid solvent in the next and then the others higher in the series, finally discharging the treated gaseous mixture from the upper chamber, and the solution of said part in said solvent from the lower chamber, said means for admitting the gaseous mixture to each body of liquid solvent comprising a tubular inlet upwardly projecting within each chamber from the bottom thereof, and an inverted bell member inserted over said tubular inlet forming an annular chamber therewith, said inverted bell member being vertically movable in relation to said tubular inlet.

2. Apparatus for freeing a gaseous mixture from a component part thereof, comprising a plurality of superimposed chambers, partitions dividing each chamber from the next, means for admitting a liquid solvent of the substance to be isolated to the upper chamber, an outlet for admitting liquid solvent to each succeeding chamber, an overflow discharge in each chamber, an external tubular connection between the overflow discharge of each chamber and the liquid inlet of the next lower chamber, an outlet for the overflow discharge of the lower chamber, means for admitting the gaseous mixture to the liquid solvent within the lower chamber, means for admitting the gaseous mixture from each chamber to the body of liquid solvent contained within the next higher chamber, said gaseous mixture admitting means comprising an upwardly directed tubular inlet and a vertically movable inverted bell surrounding and forming an annular chamber with the external surface of said tubular inlet, means for discharging the gaseous mixture freed of the isolated gas from the upper chamber, and means for cooling the liquid flowing through said tubular connections.

3. Apparatus for freeing a gaseous mixture from a component part thereof, comprising a plurality of superimposed chambers, partitions dividing each chamber from the next, means for admitting a liquid solvent of the substance to be isolated to the upper chamber, an inlet for admitting liquid solvent to each succeeding chamber, an overflow discharge in each chamber, an external tubular connection between the overflow discharge of each chamber and the liquid inlet of the next lower chamber, an outlet for the overflow discharge of the lower chamber, inverted discharge means for admitting the gaseous mixture to the liquid solvent within the lower chamber, inverted discharge means for admitting the gaseous mixture from each chamber to the body of liquid solvent contained within the next higher chamber, said gas admitting means comprising a tubular inlet upwardly extending within each chamber from the bottom thereof, and a vertically movable inverted bell member inserted over said tubular inlet, forming an annular chamber therewith, means for discharging the gaseous mixture freed of the isolated gas from the upper chamber, a shell surrounding said chambers and tubular connections, and means for establishing a circulation of cooling fluid through said shell.

FRANCESCO LOPEZ.